(12) United States Patent
Orii et al.

(10) Patent No.: US 6,735,267 B2
(45) Date of Patent: May 11, 2004

(54) FUEL ASSEMBLY

(75) Inventors: Akihito Orii, Hitachi (JP); Junichi Koyama, Yokohama (JP); Koji Nishida, Hitachiota (JP); Masao Chaki, Hitachi (JP); Toru Kanazawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/227,441

(22) Filed: Aug. 26, 2002

(65) Prior Publication Data

US 2003/0123601 A1 Jul. 3, 2003

Related U.S. Application Data

(63) Continuation of application No. 09/936,663, filed on Dec. 28, 2001, now abandoned.

(51) Int. Cl.$^7$ ................................................ G21C 3/32
(52) U.S. Cl. ................ 376/435; 376/434; 376/444; 376/419
(58) Field of Search ................. 376/435, 434, 376/444, 419

(56) References Cited

U.S. PATENT DOCUMENTS

| | | | | | |
|---|---|---|---|---|---|
| 4,968,479 | A | * | 11/1990 | Ogiya et al. | 376/428 |
| 5,068,082 | A | * | 11/1991 | Ueda et al. | 376/428 |
| 5,202,085 | A | * | 4/1993 | Aoyama et al. | 376/435 |
| 5,388,132 | A | * | 2/1995 | Aoyama et al. | 376/435 |
| 5,432,829 | A | * | 7/1995 | Aoyama et al. | 376/434 |

FOREIGN PATENT DOCUMENTS

| | | | |
|---|---|---|---|
| EP | 0514215 A1 | * | 5/1992 |
| JP | 5-232273 | | 9/1993 |
| JP | 6-94871 A | * | 4/1994 |
| JP | 6-102384 | | 4/1994 |
| JP | 6-102384 A | * | 4/1994 |
| JP | 6-294879 | | 10/1994 |
| JP | 7-234293 | | 9/1995 |
| JP | 7-301688 | | 11/1995 |
| JP | 8-292281 | | 11/1996 |
| JP | 10-115690 | | 5/1998 |
| JP | 10-288687 | | 10/1998 |
| JP | 10-311889 | | 11/1998 |
| JP | 10-325890 | | 12/1998 |
| JP | 11-194190 | | 7/1999 |

* cited by examiner

*Primary Examiner*—Michael J. Carone
*Assistant Examiner*—R. Palabrica
(74) *Attorney, Agent, or Firm*—Crowell & Moring LLP

(57) ABSTRACT

A fuel assembly in accordance with the present invention comprises a plurality of first fuel rods and a plurality of second fuel rods having a length shorter than a length of the first fuel rod, and these two kinds of fuel rods are arranged in a fuel rod array of 10 rows by 10 columns. Two water rods are arranged in regions capable of arranging 8 fuel rods. The second fuel rods are not arranged in the outermost tier of the fuel rod array. Which satisfies the following conditions, that is, $B \geq 60$ (Equation 1)

$15 \leq n \leq 20$(n: integer) (Equation 2)

$Awr/Ach \leq 0.149$ (Equation 3)

$Lp/Lf \geq 11/24$ (Equation 4)

$Awr/Ach \geq (3.00\times10^{-4}\times n^2+6.00\times10^{-4}\times n-1.2\times10^{-2})\times(Lp/Lf-1)+1.75\times10^{-1}$ (Equation 5)

$Awr/Ach \leq (8.63\times10^{-4}\times n^2-6.09\times10^{-2}\times n+1.33\times10^{-1})\times(Lp/Lf-8.32\times10^{-1})$ (Equation 6)

where Awr is a total sum of horizontal sectional areas of said water rods, Ach is a horizontal sectional area of a coolant flow passage in a bottom portion of said fuel assembly, Lf is an effective fuel length of said first fuel rod, n is number of said second fuel rods, Lp is an effective length of said second fuel rod, and B (GWd/t) is an average burn-up.

3 Claims, 14 Drawing Sheets

FUEL ASSEMBLY

This is a continuation of application Ser. No. 09/936,663, filed Dec. 28, 2001.

BACKGROUND OF THE INVENTION

1. Field of the Invention

The present invention relates to a fuel assembly and particularly to a fuel assembly suitable for a boiling water reactor and having a plurality of fuel rods arranged in 10 by 10.

2. Prior Art

In recent years, high burn-up of fuel assemblies are required from the viewpoints of effective use of the uranium resource and reduction of the generated amount of used fuel assemblies. In order to attain high burn-up, it is required to increase an average enrichment of the fissionable materials in the fuel assembly. However, because increase of the enrichment causes increase in reactivity change due to void change, an absolute value of void coefficient is increased to deteriorate reactor core stability. The reactor core stability can be improved by increasing the moderator ratio (the ratio of moderator to fuel) in the fuel assembly.

In order to effectively react the fissionable material and to maintain the nuclear-thermal-hydraulic stability of the boiling water reactor stable, it is necessary to increase the moderator ratio in the fuel assembly as the enrichment of the fissionable materials is increased.

A fuel assembly capable of attaining a burn-up of 45 GWd/t by arranging fuel rods in an array of 9 rows by 9 columns is disclosed in Japanese Patent Application Laid-Open No.7-234293. This fuel assembly comprises two large-diameter water rods arranged in a region capable of placing seven fuel rods in the central portion of cross section, and eight short-length fuel rods having an axial length shorter than that of the other fuel rods. These short-length fuel rods improve the void coefficient of the fuel assembly. Further, use of the short-length fuel rods decreases the pressure loss of the fuel assembly because the cooling water flow passage area is increased in the steam-water two-phase region in the upper portion of the fuel assembly. Most of fuel assemblies having a fuel rod array of above 9 rows by 9 columns comprise short-length fuel rods.

Further, a fuel assembly having a fuel rod array of 10 rows by 10 columns is disclosed in Japanese Patent Application Laid-Open No.5-232273. In this fuel assembly, short-length fuel rods are arranged adjacently to non-boiling region (a water rod, a gap water region) so as to accelerate the neutron slowing down effect to increase the improving effect of void coefficient.

SUMMARY OF THE INVENTION

An object of the present invention is to provide a fuel assembly which is capable of attaining allowable core stability by further increasing burn-up and without increasing the pressure loss compared to a conventional fuel assembly.

A feature of a first invention capable of attaining the above object is a fuel assembly comprising a plurality of first fuel rods and a plurality of second fuel rods having a length shorter than a length of the first fuel rod, the first and the second fuel rods being arranged in a fuel rod array of 10 rows by 10 columns; and a plurality of water rods occupying regions capable of arranging 8 fuel rods, the second fuel rods being not arranged in the outermost tier of the fuel rod array, which satisfies the following conditions, that is, $$B \geq 60 \quad \text{(Equation 1)}$$

$$15 \leq n \leq 20 (n: \text{integer}) \quad \text{(Equation 2)}$$

$$Awr/Ach \leq 0.149 \quad \text{(Equation 3)}$$

$$Lp/Lf \geq 11/24 \quad \text{(Equation 4)}$$

$$Awr/Ach \geq (3.00 \times 10^{-4} \times n^2 + 6.00 \times 10^{-4} \times n - 1.2 \times 10^{-2}) \times (Lp/Lf - 1) + 1.75 \times 10^{-1} \quad \text{(Equation 5)}$$

$$Awr/Ach \leq (8.63 \times 10^{-4} \times n^2 - 6.09 \times 10^{-2} \times n + 1.33 \times 10^{-1}) \times (Lp/Lf - 8.32 \times 10^{-1}) \quad \text{(Equation 6)}$$

where Awr is a total sum of horizontal sectional areas of the water rods, Ach is a horizontal sectional area of a coolant flow passage in a bottom portion of the fuel assembly, Lf is an effective fuel length of the first fuel rod, n is number of the second fuel rods, Lp is an effective length of the second fuel rod, and B (GWd/t) is an average burn-up.

The present invention satisfying the above conditions can further increase burn-up, and can attain allowable core stability without increasing the pressure loss compared to a conventional fuel assembly.

A feature of a second invention capable of attaining the above object is a fuel assembly comprising a plurality of first fuel rods and a plurality of second fuel rods having a length shorter than a length of the first fuel rod, the first and the second fuel rods being arranged in a fuel rod array of 10 rows by 10 columns; and a plurality of water rods occupying regions capable of arranging 9 fuel rods, the second fuel rods being not arranged in the outermost tier of the fuel rod array, which satisfies the following conditions:

$$B \geq 60 \quad \text{(Equation 1)}$$

$$10 \leq n \leq 20 (n: \text{integer}) \quad \text{(Equation 7)}$$

$$Awr/Ach \leq 0.169 \quad \text{(Equation 8)}$$

$$Lp/Lf \geq 11/24 \quad \text{(Equation 4)}$$

$$Awr/Ach \geq (2.65 \times 10^{-4} \times n^2 + 2.15 \times 10^{-3} \times n - 1.96 \times 10^{-2}) \times (Lp/Lf - 1) + 1.68 \times 10^{-1} \quad \text{(Equation 9)}$$

$$Awr/Ach \leq (7.41 \times 10^{-4} \times n^2 - 5.63 \times 10^{-2} \times n + 8.84 \times 10^{-2}) \times (Lp/Lf - 8.52 \times 10^{-1}) \quad \text{(Equation 10)}$$

where Awr is a total sum of horizontal sectional areas of the water rods, Ach is a horizontal sectional area of a coolant flow passage in a bottom portion of the fuel assembly, Lf is an effective fuel length of the first fuel rod, n is number of the second fuel rods, Lp is an effective length of the second fuel rod, and B (GWd/t) is an average burn-up.

The second invention can also attain the same effects as those of the first invention.

A feature of a third invention capable of attaining the above object is a fuel assembly comprising a plurality of first fuel rods and a plurality of second fuel rods having a length shorter than a length of the first fuel rod, the first and the second fuel rods being arranged in a fuel rod array of 10 rows by 10 columns; and a plurality of water rods occupying regions capable of arranging 10 fuel rods, the second fuel rods being not arranged in the outermost tier of the fuel rod array, which satisfies the following conditions, that is, $$B \geq 60 \quad \text{(Equation 1)}$$

$$9 \leq n \leq 20 (n: \text{integer}) \quad \text{(Equation 11)}$$

$$Awr/Ach \leq 0.190 \quad \text{(Equation 12)}$$

$$Lp/Lf \geq 11/24 \quad \text{(Equation 4)}$$

$$Awr/Ach \geq (2.31\times10^{-4}\times n^2+3.69\times10^{-3}\times n-2.71\times10^{-2})\times(Lp/Lf-1)+1.60\times10^{-1} \quad \text{(Equation 13)}$$

$$Awr/Ach \leq (6.18\times10^{-4}\times n^2-5.18\times10^{-2}\times n+4.41\times10^{-2})\times(Lp/Lf-8.72\times10^{-1}) \quad \text{(Equation 14)}$$

where Awr is a total sum of horizontal sectional areas of the water rods, Ach is a horizontal sectional area of a coolant flow passage in a bottom portion of the fuel assembly, Lf is an effective fuel length of the first fuel rod, n is number of the second fuel rods, Lp is an effective length of the second fuel rod, and B (GWd/t) is an average burn-up.

The third invention can also attain the same effects as those of the first invention.

A feature of a fourth invention capable of attaining the above object is a fuel assembly comprising a plurality of first fuel rods and a plurality of second fuel rods having a length shorter than a length of the first fuel rod, the first and the second fuel rods being arranged in a fuel rod array of 10 rows by 10 columns; and a plurality of water rods occupying regions capable of arranging 8 fuel rods, the second fuel rods being arranged both at positions in the outermost tier of the fuel rod array and at positions adjacent to the water rods, or only at positions in the outermost tier of the fuel rod array, which satisfies the following conditions, that is, $$B \geq 60 \quad \text{(Equation 1)}$$

$$9 \leq n \leq 20 (n: \text{integer}) \quad \text{(Equation 11)}$$

$$Awr/Ach \leq 0.149 \quad \text{(Equation 3)}$$

$$Lp/Lf \geq 11/24 \quad \text{(Equation 4)}$$

$$Awr/Ach \geq (3.00\times10^{-4}\times n^2+6.00\times10^{-4}\times n+6.80\times10^{-2})\times(Lp/Lf-1)+1.75\times10^{-1} \quad \text{(Equation 15)}$$

$$Awr/Ach \leq (8.63\times10^{-4}\times n^2-6.09\times10^{-2}\times n+1.33\times10^{-2})\times(Lp/Lf-8.32\times10^{-1}) \quad \text{(Equation 6)}$$

where Awr is a total sum of horizontal sectional areas of the water rods, Ach is a horizontal sectional area of a coolant flow passage in a bottom portion of the fuel assembly, Lf is an effective fuel length of the first fuel rod, n is number of the second fuel rods, Lp is an effective length of the second fuel rod, and B (GWd/t) is an average burn-up.

The fourth invention can also attain the same effects as those of the first invention.

A feature of a fifth invention capable of attaining the above object is a fuel assembly comprising a plurality of first fuel rods and a plurality of second fuel rods having a length shorter than a length of the first fuel rod, the first and the second fuel rods being arranged in a fuel rod array of 10 rows by 10 columns; and a plurality of water rods occupying regions capable of arranging 9 fuel rods, the second fuel rods being arranged both at positions in the outermost tier of the fuel rod array and at positions adjacent to the water rods, or only at positions in the outermost tier of the fuel rod array, which satisfies the following conditions, that is, $$B \geq 60 \quad \text{(Equation 1)}$$

$$8 \leq n \leq 20 (n: \text{integer}) \quad \text{(Equation 16)}$$

$$Awr/Ach \leq 0.169 \quad \text{(Equation 8)}$$

$$Lp/Lf \geq 11/24 \quad \text{(Equation 4)}$$

$$Awr/Ach \geq (2.65\times10^{-4}\times n^2+2.15\times10^{-3}\times n+6.04\times10^{-2})\times(Lp/Lf-1)+1.68\times10^{-1} \quad \text{(Equation 17)}$$

$$Awr/Ach \leq (7.41\times10^{-4}\times n^2-5.63\times10^{-2}\times n+8.84\times10^{-2})\times(Lp/Lf-8.52\times10^{-1}) \quad \text{(Equation 10)}$$

where Awr is a total sum of horizontal sectional areas of the water rods, Ach is a horizontal sectional area of a coolant flow passage in a bottom portion of the fuel assembly, Lf is an effective fuel length of the first fuel rod, n is number of the second fuel rods, Lp is an effective length of the second fuel rod, and B (GWd/t) is an average burn-up.

The fifth invention can also attain the same effects as those of the first invention.

A feature of a sixth invention capable of attaining the above object is a fuel assembly comprising a plurality of first fuel rods and a plurality of second fuel rods having a length shorter than a length of the first fuel rod, the first and the second fuel rods being arranged in a fuel rod array of 10 rows by 10 columns; and a plurality of water rods occupying regions capable of arranging 10 fuel rods, the second fuel rods being arranged both at positions in the outermost tier of the fuel rod array and at positions adjacent to the water rods, or only at positions in the outermost tier of the fuel rod array, which satisfies the following conditions, that is, $$B \geq 60 \quad \text{(Equation 1)}$$

$$7 \leq n \leq 20 (n: \text{integer}) \quad \text{(Equation 18)}$$

$$Awr/Ach \leq 0.190 \quad \text{(Equation 12)}$$

$$Lp/Lf \geq 11/24 \quad \text{(Equation 4)}$$

$$Awr/Ach \leq (2.31\times10^{-4}\times n^2+3.69\times10^{-3}\times n+5.29\times10^{-2})\times(Lp/Lf-1)+1.60\times10^{-1} \quad \text{(Equation 19)}$$

$$Awr/Ach \leq (6.18\times10^{-4}\times n^2-5.18\times10^{-2}\times n+4.41\times10^{-2})\times(Lp/Lf-8.72\times10^{-1}) \quad \text{(Equation 14)}$$

where Awr is a total sum of horizontal sectional areas of the water rods, Ach is a horizontal sectional area of a coolant flow passage in a bottom portion of the fuel assembly, Lf is an effective fuel length of the first fuel rod, n is number of the second fuel rods, Lp is an effective length of the second fuel rod, and B (GWd/t) is an average burn-up.

The sixth invention can also attain the same effects as those of the first invention.

DESCRIPTION OF THE PREFERRED EMBODIMENTS

Embodiment 1

Figure 1:
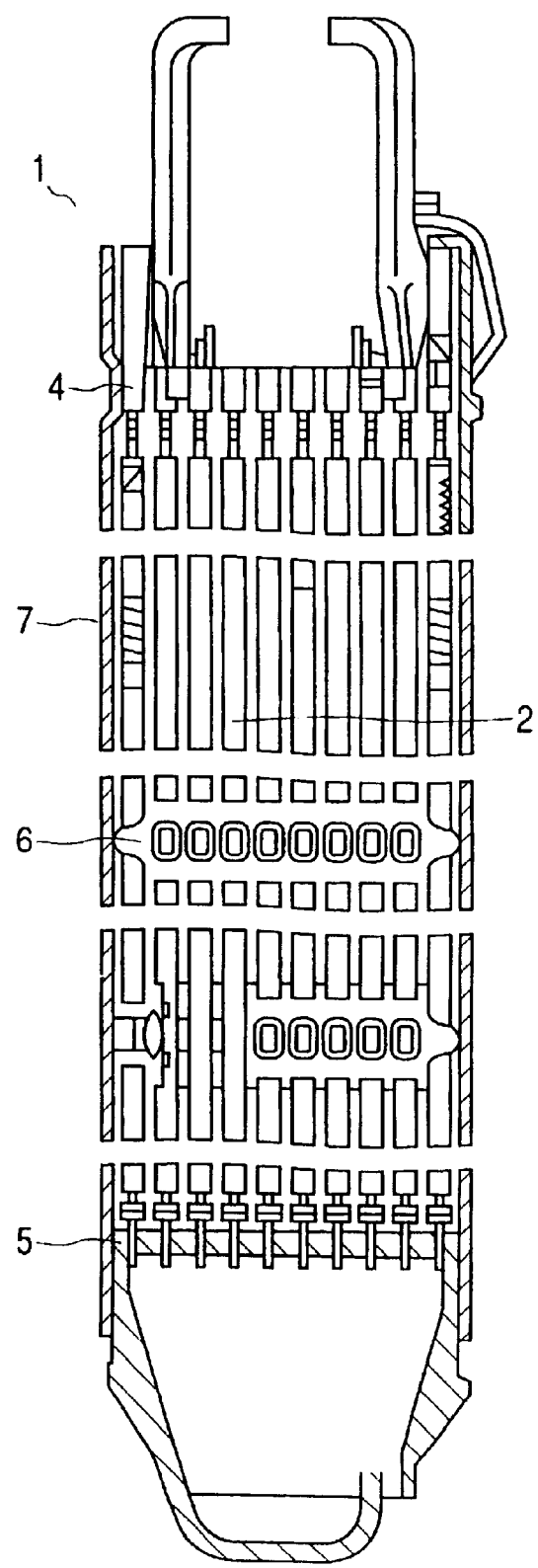
FIG. 1 is a vertical cross-sectional view showing a preferable embodiment of a fuel assembly in accordance with the present invention.

As described above, the void coefficient is influenced mainly by the water rod area, and by number and length and further by positions of the short length fuel rods. However, in the conventional example described above, effect of the void coefficient on the core stability depending on number and length of the short length fuel rods has not be quantitatively evaluated. From the viewpoint of backfitting a newly designed fuel assembly to an existing nuclear core, it is necessary to keep the core stability in nearly the same level compared to the case of using conventional fuel assemblies. Therefore, when the void coefficient described above is insufficiently evaluated, it can not be said that evaluation of the core stability (area of water rods, number and length of the short length fuel rods) attainable high burn-up is sufficient. Further, the effect on the pressure loss of assembly important for backfitting, that is, the effect of area of water rods and the effects of number and length of short length fuel rods on the pressure loss are not considered.

A preferred embodiment of a fuel assembly in accordance with the present invention will be described below, referring to FIG. 1 and FIG. 2. The fuel assembly 1 is loaded in a reactor core of a boiling water reactor. In the fuel assembly 1, fuel rods 2 are arranged in a square array of 10 rows by 10 columns. The fuel rods 2 include fuel rods 2A having a long axial length and short length fuel rods 2B having an axial length shorter than that of the fuel rod 2A. In the center of the horizontal section of the fuel assembly 1, two water rods 3 are arranged. Each of the water rods 3 has a circular horizontal cross section the area of which occupies a region capable of arranging the four fuel rods. The two water rods 3 are arranged so that a center axis of each of the water rods is positioned on one diagonal line of the fuel assembly 1. These water rods 3 are arranged in a region of the fourth tier from the outer side of the fuel rod array, and arranged in the symmetrical positions with respect to the other diagonal line (the diagonal line which passes through a corner portion 8 facing a control rod when the fuel assembly 1 is loaded into the core of the boiling water reactor). The upper end portions of the fuel rods 2A and the water rods 3 are held by an upper tie plate 4 and the lower end portions are held by a lower tie plate 5. The lower end portions of the short length fuel rods 2B are held by the lower tie plate 5. The fuel rods 2A, 2B and the water rods 3 are held with a spacing one another by fuel spacers 6. These fuel rods are contained in a channel box 7 attached to the upper tie plate 4.

Twelve rods among the sixteen short length fuel rods 2B are arranged in the second tier from the outer side of the fuel rod array. In the second tier of the fuel rod array, the twelve short length fuel rods 2B are arranged at positions in each of the corners and in two rods away from each of the corners. The remainder of the four short length fuel rods 2B are arranged adjacent to the water rods 3. In the present embodiment, the inner width Dcb of the channel box 7 is approximately 134 mm, the outer diameter Df of the fuel rods 2A and 2B is 10.26 mm, the fuel rod pitch Pf is 12.95 mm, and the effective fuel length Lf of the fuel rod 2A is approximately 3.7 m. In the present embodiment, the short length fuel rods 2B are not arranged in the outermost tier of the fuel rod array.

The present embodiment of the fuel assembly 1 is constructed so that the effective fuel length Lp of the short length fuel rod 1B and the total horizontal sectional area Awr of the water rods 2 satisfy the conditions of Equation 1 to Equation 6. The conditions of Equation 1 to Equation 6 are found from a study performed by the inventors of the present invention. The results of the study will be described in detail below.

Figure 3:
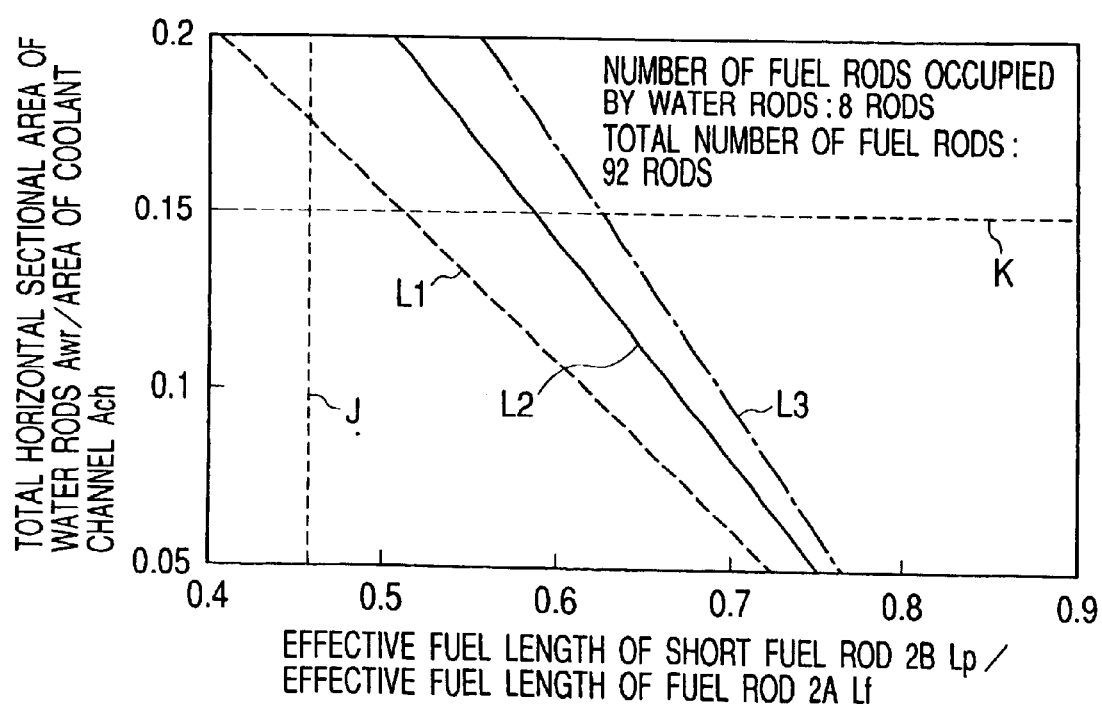
FIG. 3 is a characteristic diagram showing the relationship between effective fuel length Lp of short length fuel rod 2B/effective fuel length Lf of fuel rod 2A and total horizontal sectional area Awr of water rods/coolant channel area Ach in fuel assembly determined from pressure loss.

Firstly, Equation 6 determined from the pressure loss of the fuel assembly will be described. The inventors of the present invention calculated a total horizontal sectional area of water rods 3 in the 10-by-10 fuel assembly having a pressure loss equal to that of a conventional 9-by-9 fuel assembly disclosed in Japanese Patent Application Laid-Open No.7-234293 (hereinafter, simply referred to as the conventional fuel assembly) by varying number of the short length fuel rods and effective fuel length of the short length fuel rod as parameters, and found the relationships between the number of the short length fuel rods, the effective fuel length Lp of the short length fuel rod and the total horizontal sectional area of all the water rods. The relationships are shown in FIG. 3. In FIG. 3, the abscissa indicates a ratio (Lp/Lf) of the effective fuel length Lp of the short length fuel rod 2B to the effective fuel length Lf of the fuel rod 2A, and the ordinate indicates a ratio (Awr/Ach) of the total horizontal sectional area Awr of all the water rods in the fuel assembly to the area Ach of the coolant flow passage of the fuel assembly in the lower portion of the fuel assembly. Therein, the coolant channel area Ach can be roughly expressed by the following equation. The coolant flow passage of the fuel assembly is a region inside the channel box 7 and outside the fuel rods 2 and the water rods 3.

$$Ach = Dcb^2 - \pi/4 \times Df^2 \times (100-8) - Awr \quad \text{(Equation 20)}$$

By substituting the numerical values corresponding to the present embodiment described above into Equation 20, the following equation can be obtained.

$$Ach = 10350 - Awr (mm^2) \quad \text{(Equation 21)}$$

The diagram means that when a value of the abscissa is 0.5, the effective fuel length of the short length fuel rod 2B is approximately 1.85 m (3.7 m×0.5). Referring to FIG. 3, the reference characters L1, L2, L3 are boundary lines depending on number of the short length fuel rods 2B. The boundary line L1 indicates a case where number of the short length fuel rods 2B is 12, the boundary line L2 indicates a case where number of the short length fuel rods 2B is 16, and the boundary line L3 indicates a case where number of the short length fuel rods 2B is 20. In the case where number of the short length fuel rods 2B is 16, the boundary line L2 in the diagram is a boundary satisfying the condition that the pressure loss is equal to the pressure loss of the conventional fuel assembly. In the case where number of the short length fuel rods 2B is 16, on the boundary line L2 and the zone below the boundary line L2 are a zone where the pressure loss is not larger than the pressure loss of the conventional fuel assembly. Therefore, by constructing the fuel assembly so that the total horizontal sectional area of all the water rods falls in the zone below the boundary line L2 including on the boundary line L2, The pressure loss of the present embodiment of the fuel assembly can be equal to and smaller than that of the conventional fuel assembly. That is, the value Awr/Ach should satisfy Equation 6. Each of the boundary lines depending on number of the short length fuel rods 2B in the fuel assembly is expressed by Equation 6 including number n of the short length fuel rods as the parameter.

In addition, the dotted line K in FIG. 3 indicates the maximum value of the total horizontal sectional area of all the water rods occupying a region for 8 rods of the fuel rods, and can be expressed by the following equation.

$$Awr = Pf^2 \times 8 \quad \text{(Equation 22)}$$

Therefore, the value Awr/Ach to the upper limit value of the total horizontal sectional area of all the water rods becomes as follows.

$$Awr/Ach = 1342/(10350-1342) = 0.149 \quad \text{(Equation 23)}$$

Therefore, the value Awr/Ach must be smaller than 0.149, that is, Equation 3.

Further, the value corresponding to the abscissa of the dotted line J corresponds to a length that the effective fuel length of the short length fuel rod 2B becomes 11/24 (=0.458) of the effective fuel length of the fuel rod 2A. In this length, the upper end portion of the short length fuel rods including a length of the gas plenum (formed in the fuel rod) are supported by one of the fuel spacers placed in the nearly middle portion in the axial direction of the fuel assembly. However, if the effective fuel length of the short length fuel rod 2B is further shortened, it is necessary from the viewpoint of flow-induced vibration of the short length fuel rod that the effective fuel length of the short length fuel rod is formed about 8/24 of the effective fuel length of the fuel rod 2A. When the effective fuel length of the short length fuel rod 2B is made shorter than 11/24 as described above, the uranium inventory becomes too small to deteriorate the fuel cycle cost. Therefore, the value Lp/Lf must be larger than 11/24 (Equation 4).

Figure 4:
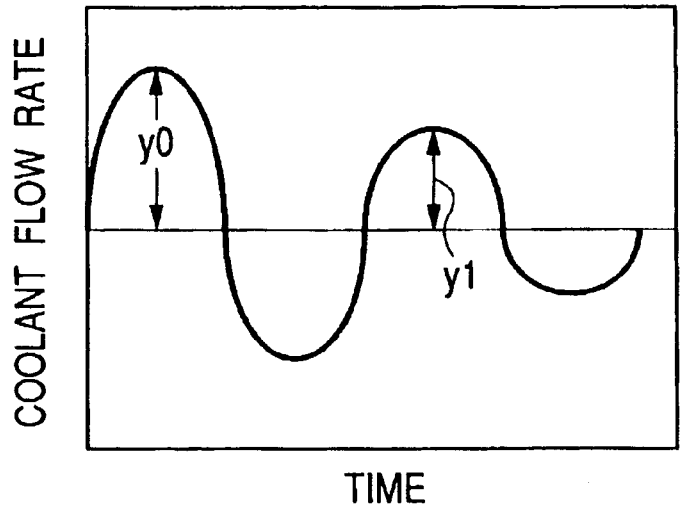
FIG. 4 is a chart explaining a stability index of amplitude damping ratio under a stable state.

Next, Equation 5 determined from the core stability will be described below. The core stability is a characteristic relating to fluctuation of the core flow rate and the reactor output power of the whole core after a disturbance is added to the reactor core. Here, it is assumed that a disturbance of sinusoidal core flow rate is added to the reactor core. Further, it is also assumed that the fluctuation of the core flow rate in the reactor core after adding the disturbance is as shown in FIG. 4. In the fluctuation of FIG. 4, the amplitude of the fluctuation is decreased with time and the core flow rate returns to a stable state in a short time.

Figure 5:
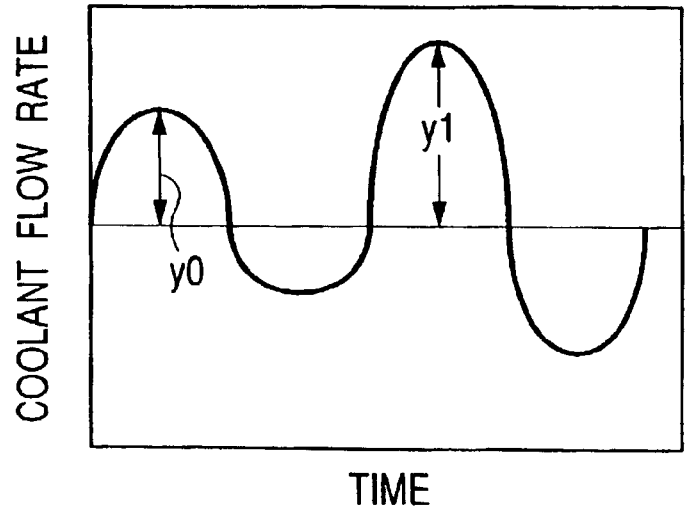
FIG. 5 is a chart explaining the stability index of amplitude damping ratio under an unstable state.

Therein, letting an amplitude of the disturbance added to the reactor core be y0, and an amplitude one cycle after that time be y1, the amplitude damping ratio is defined as the value y1/y0. In the case of FIG. 4, the amplitude damping ratio is smaller than 1, and the reactor core is returned to a stable state (a normal state). In such a case, it is said that the reactor core is stable. On the other hand, in the case of FIG. 5, the amplitude damping ratio is larger than 1, and the fluctuation of the core flow rate in the reactor core is increased as the time elapses. This is not preferable state from the viewpoint of reactor operation. Therefore, the core stability can be evaluated as stable when the amplitude damping ratio is smaller than 1, and as unstable when the amplitude damping ratio is larger than 1. Therefore, although the core stability can be evaluated as stable when the amplitude damping ratio is smaller than 1, design is practically performed by setting the amplitude damping ratio to 0.8 for taking a margin.

Figure 6:
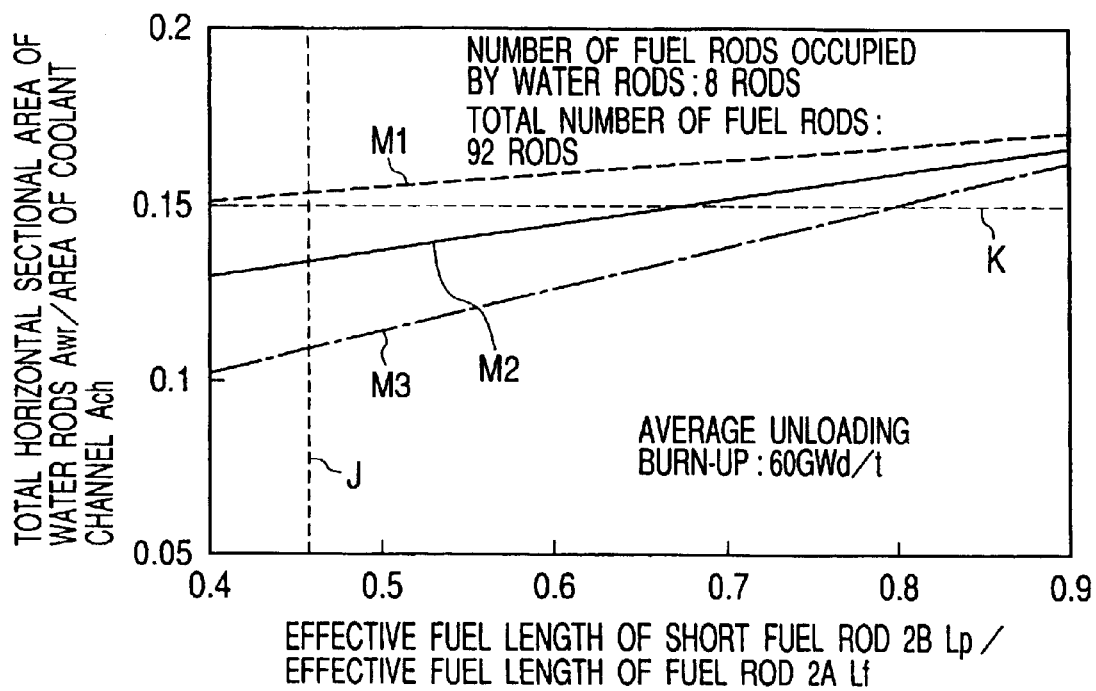
FIG. 6 is a characteristic diagram showing the relationship between effective fuel length Lp of short length fuel rod 2B/effective fuel length Lf of fuel rod 2A and total horizontal sectional area Awr of water rods/coolant channel area Ach in fuel assembly determined from core stability.

The inventors of the present invention calculated a horizontal sectional area of water rods in the 10-by-10 fuel assembly satisfying the amplitude damping ratio of 0.8 by varying number of the short length fuel rods and effective fuel length of the short length fuel rod as parameters, and found the relationships between the number of the short length fuel rods, the effective fuel length of the short length fuel rod and the horizontal sectional area of the water rods. Further, in order attain a high burn-up higher than the average unloading burn-up 45 Gwd/t of the conventional 9-by-9 fuel assembly, the average unloading burn-up was set to 60 GWd/t. FIG. 6 shows the analysis results. The ordinate and the abscissa of FIG. 6 are the same as those of FIG. 3. Similarly to the analysis results of the pressure loss, the boundary line is drawn for each number of the short length fuel rods. The boundary line M1 is the result for the case where number of the short length fuel rods is 12, the boundary line M2 is the result for the case where number of the short length fuel rods is 16, and the boundary line M3 is the result for the case where number of the short length fuel rods is 20. In the case of 16 rods of the short length fuel rods, the boundary line M2 is the boundary satisfying the amplitude damping ratio of 0.8, and the zone on the boundary line M2 and above the boundary line M2 is the zone where the amplitude damping ratio is below 0.8. Therefore, when the fuel assembly is constructed so that the total horizontal sectional area of all the water rods falls in the zone above the solid line M2 including on the solid line M2, the average unloading burn-up of 60 GWd/t can be attained, and the allowable core stability can be maintained. That is, Awr/Ach should satisfy Equation 5. Each of the boundary lines depending on number of the short length fuel rods 2B in the fuel assembly is expressed by Equation 5 including number n of the short length fuel rods as the parameter.

Figure 7:
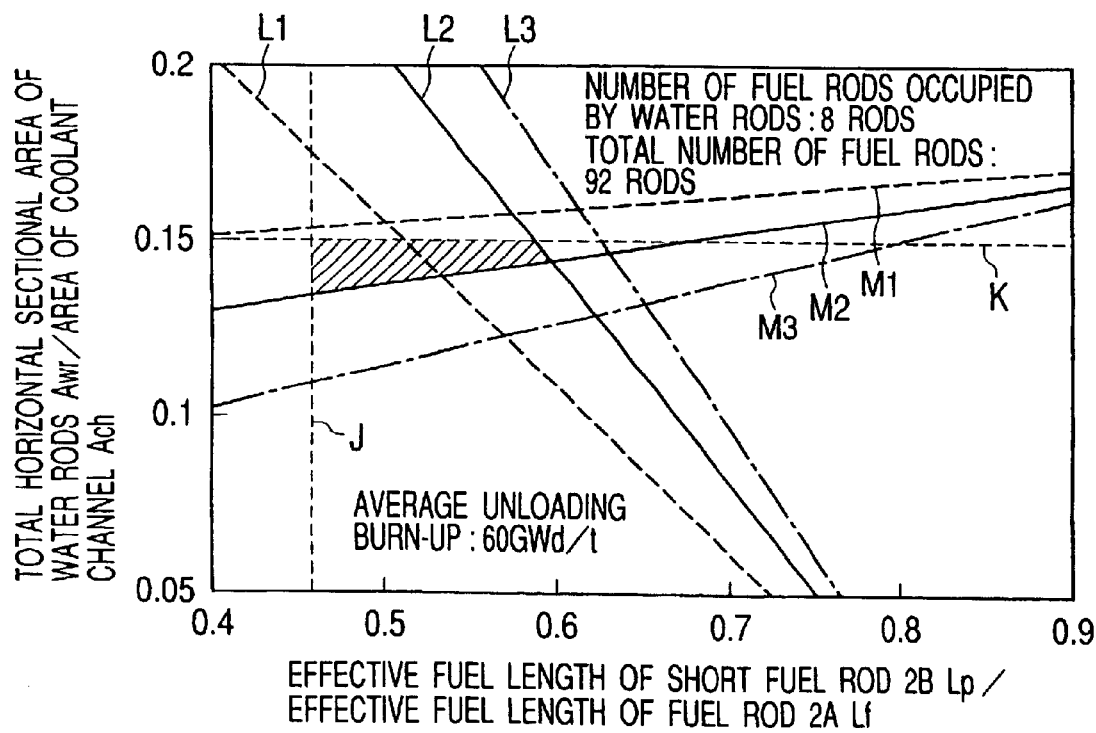
FIG. 7 is a characteristic diagram showing the both characteristics shown in FIG. 3 and FIG. 6.

The boundary lines for the pressure loss shown in FIG. 3, the boundary lines for the core stability shown in FIG. 6 and the boundary lines J and K are shown in FIG. 7. In the case of 12 rods of the short length fuel rods, the boundary line M1 expressing the minimum required total horizontal sectional area of all the water rods determined from the core stability is positioned above the dotted line K. Accordingly, the case of 12 rods of the short length fuel rods requires a total horizontal sectional area of all the water rods larger than the maximum total horizontal sectional area of all the water rods in the region occupied by eight fuel rods in the present embodiment. Therefore, in the case of 12 rods of the short length fuel rods, the core stability can not be satisfied under the condition of average unloading burn-up of 60 GWd/t.

As described above, in the case where the water rods are arranged in the region capable of being occupied by 8 fuel rods and the short length fuel rods are arranged in the fuel rod array except the outermost tier, required number of the short length fuel rods is larger than 15 rods. On the other hand, when number of the short length fuel rods is increased above 21, the void coefficient is improved, but the uranium inventory is excessively reduced. In addition, it is not preferable from the viewpoint of the mechanical strength of the fuel spacers for holding the fuel rods with a spacing between one another which are positioned above the upper end of the short length fuel rod. Therefore, number of the short length fuel rods should be smaller than 20. Thus, the number n of the short length fuel rods should satisfy the condition of $15 \leq n \leq 20$, that is, Equation 2.

In FIG. 7, the hatched zone is a zone where Equation 1, Equation 3 to Equation 6 are satisfied to the 10-by-10 fuel assembly of the present embodiment having 16 rods of the short length fuel rods. The ratio Lp/Lf and the horizontal sectional area of the water rods 3 are set so as to fall into this zone. However, even in a case of $15 \leq n \leq 20$, there is a zone where Equation 1, Equation 3 to Equation 6 are satisfied.

According to the present embodiment, the average unloading burn-up of 60 GWd/t can be attained, and the allowable core stability can be attained without increasing the pressure loss compared to that of the conventional fuel assembly. Further, the fuel assemblies of the present embodiment can be applied to the existing boiling water reactor. In Japanese Patent Application Laid-Open No.5-232273 there is no description that the burn-up above 60 GWd/t is attained using the fuel assembly having a fuel rod array of 10 rows by 10 columns. The fuel assembly of the present embodiment can attain the burn-up above 60 GWd/t by 10 columns by satisfying the conditions of Equation 1 to Equation 6, and in the fuel assembly having the fuel rod array of 10 rows, the allowable core stability can be attained without increasing the pressure loss larger than that of the conventional fuel assembly.

Figure 2:
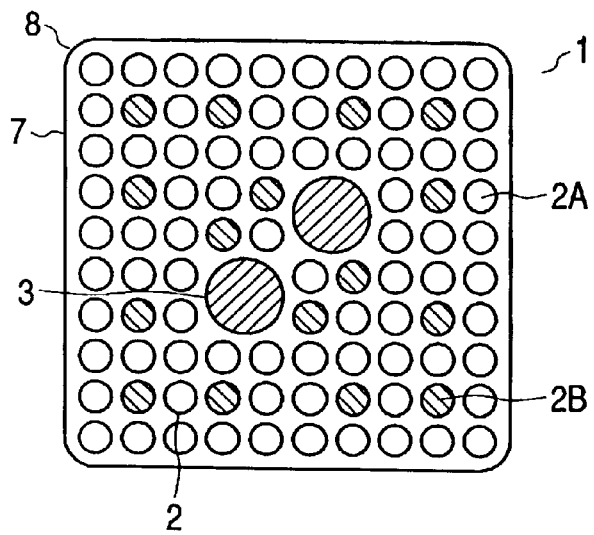
FIG. 2 is a horizontal cross-sectional view showing the fuel assembly shown in FIG. 1.
Figure 8:
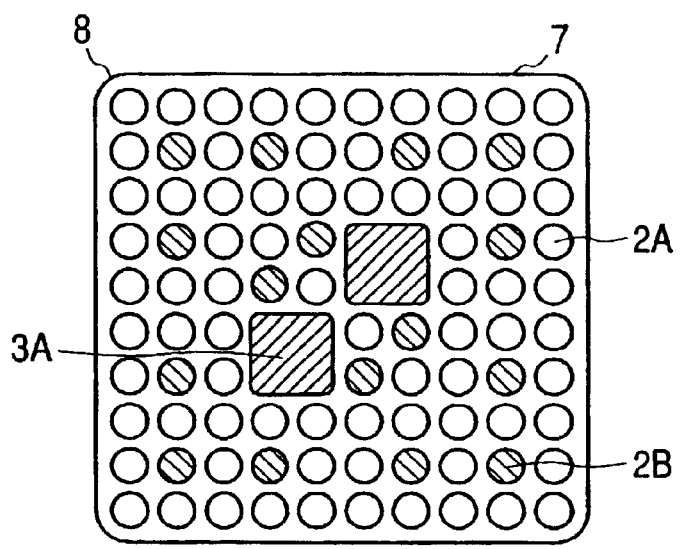
FIG. 8 and FIG. 9 are horizontal cross-sectional views showing other embodiments of fuel assemblies in accordance with the present invention.

In the present embodiment, the same effects can be obtained even in a case where the short length fuel rods are arranged in different positions from those of FIG. 1 unless the short length fuel rods are arranged in the outermost tier. Further, the same effects can be obtained the water rod is changed to a rectangular water rod 3A as shown in FIG. 8 or to a water rod having another shape if the total horizontal sectional area is the same. Since Equation 20 includes the channel box inner width Dcb and the fuel rod outer diameter Df, the present embodiment can also cope with small changes in the channel box inner width and the fuel rod outer diameter.

Embodiment 2

Figure 9:
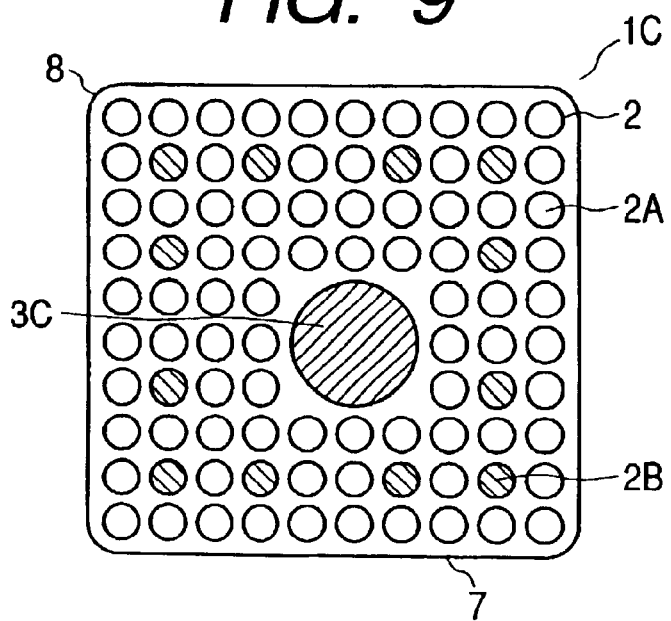

A second embodiment of a fuel assembly in accordance with the present invention will be described below, referring to FIG. 9. The present embodiment of the fuel assembly 1C is loaded in a reactor core of a boiling water reactor. In the fuel assembly 1C, the two water rods 3 of the fuel assembly 1 shown in FIG. 1 are replaced with one water rod 3C. The other structure of the present embodiment is the same as that of the fuel assembly shown in FIG. 1. The water rod 3C has a circular horizontal section, and occupies a region capable of arranging 9 fuel rods. The center axis of the water rod 3C is arranged at a position dislocated from a center axis of the fuel assembly toward a side opposite to a corner portion 8 facing a control rod under a condition that the fuel assembly 1C is loaded in the core of the boiling water reactor. Consequently, there exist four tiers of the fuel rod array in the side of the corner portion 8 between the water rod 3C and the channel box 7. On the other hand, there exist three tiers of the fuel rod array in the opposite side of the corner portion 8 between the water rod 3C and the channel box 7. In the second tier from the outer side of the fuel rod array, the twelve short length fuel rods 2B are arranged at positions in each of the corners and in two rods away from each of the corners. The dimensions of the inner width Dcb of the channel box 7, the outer diameter Df of the fuel rod 2, the fuel rod pitch Pf and the effective fuel length Lf of the fuel rod 2A are the same as those of the fuel assembly 1. In the present embodiment, the short length fuel rods 2B are not arranged in the outermost tier of the fuel rod array either.

The present embodiment of the fuel assembly 1C is constructed so that the effective fuel length Lp of the short length fuel rod 1B and the total horizontal sectional area Awr of the water rod 3C satisfy the conditions of Equation 1, Equation 4, and Equation 7 to Equation 10. The conditions of Equation 7 to Equation 10 are found from a study performed by the inventors of the present invention.

Figure 10:
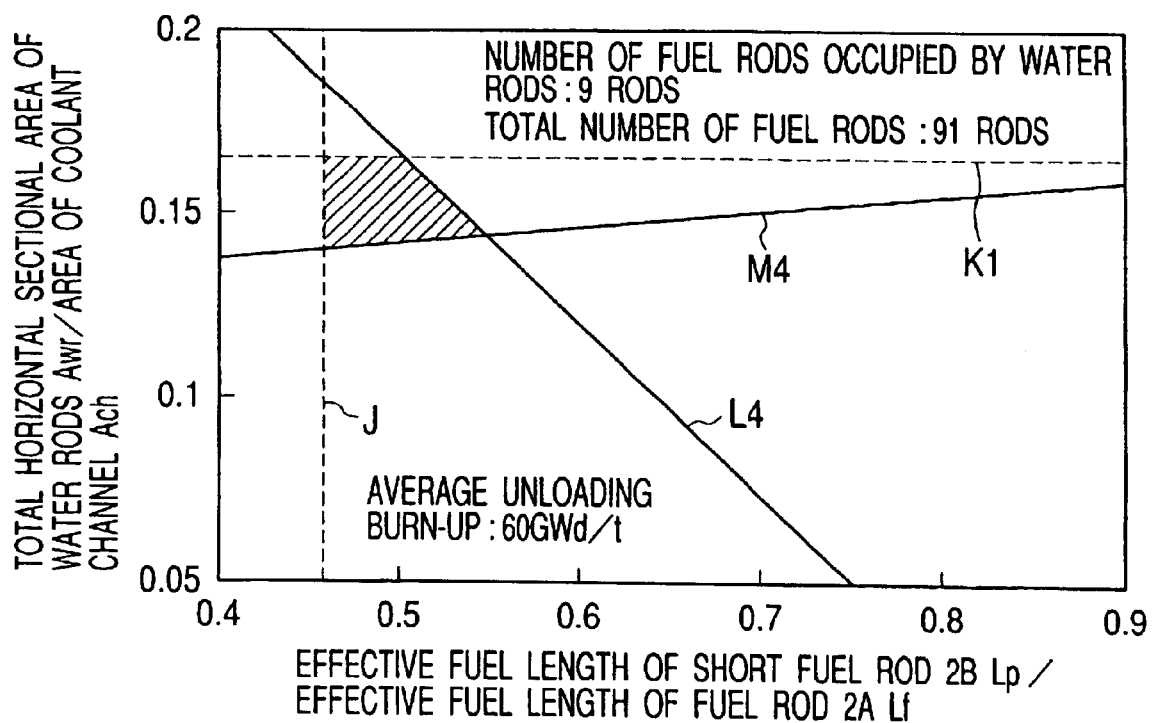
FIG. 10 is a characteristic diagram showing the relationship between effective fuel length Lp of short length fuel rod 2B/effective fuel length Lf of fuel rod 2A and total horizontal sectional area Awr of water rods/coolant channel area Ach in fuel assembly determined from pressure loss and core stability in the fuel assembly of FIG. 9.

An example of a boundary line derived from individual analyses of the pressure loss and the core stability in the present embodiment of the fuel assembly 1C similarly to Embodiment 1 is shown in FIG. 10. The boundary line L4 shown in FIG. 10 is a boundary line for the pressure loss when 12 rods of the short length fuel rods 2B are arranged in the fuel rod array of the fuel assembly 1C except the outermost tier. Similarly, the boundary line M4 is a boundary line for the core stability when 12 rods of the short length fuel rods 2B are arranged.

Therein, the coolant channel area Ach in the fuel assembly 1C can be roughly expressed by the following equation.

$$Ach = Dcb^2 - \pi/4 \times Df^2 \times (100-9) - Awr \quad \text{(Equation 24)}$$

By substituting the numerical values corresponding to the present embodiment described above into Equation 24, the following equation can be obtained.

$$Ach = 10432 - Awr (mm^2) \quad \text{(Equation 25)}$$

In addition, the dotted line K1 in FIG. 10 indicates the maximum value of the total horizontal sectional area of all the water rods occupying a region for 9 rods of the fuel rods, and can be expressed by the following equation.

$$Awr = Pf^2 \times 9 \quad \text{(Equation 26)}$$

Therefore, the value Awr/Ach to the upper limit value of the total horizontal sectional area of all the water rods becomes as follows.

$$Awr/Ach = 1509/(10432-1509) = 0.169 \quad \text{(Equation 27)}$$

Therefore, the value Awr/Ach must be smaller than 0.169, that is, Equation 8.

Further, in this embodiment, the required number of the short length fuel rods 2B is within a range of 10 to 20 which is obtained from a study similar to that of Embodiment 1.

In FIG. 10, Equation 8 corresponds to the zone lower than the dotted line K1 including the dotted line K1, and Equation 4 corresponds to the zone in right hand side from the dotted line J including the dotted line J. In FIG. 10, the hatched zone is a zone where Equation 1, Equation 4, and Equation 8 to Equation 10 are satisfied to the fuel assembly having 12 rods of the short length fuel rods 2B arranged as shown in FIG. 9. The ratio Lp/Lf and the horizontal sectional area of the water rod 3 are set so as to fall into this zone. However, even in a case of satisfying Equation 7, that is, $10 \leq n \leq 20$, there is a zone where Equation 1, Equation 4, and Equation 8 to Equation 10 are satisfied.

Figure 11:
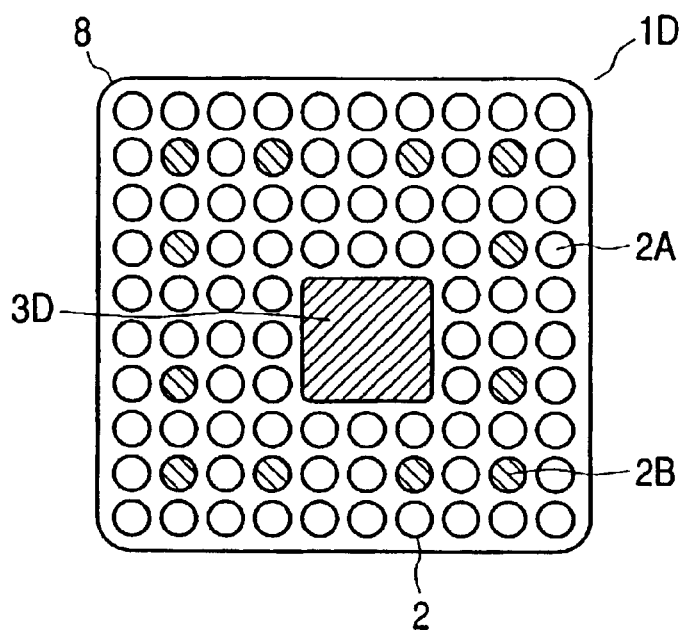
FIG. 11 and FIG. 12 are horizontal cross-sectional views showing other embodiments of fuel assemblies in accordance with the present invention.

According to the present embodiment, the same effects similar to those of Embodiment 1 can be obtained. The short length fuel rods may be arranged in different positions from those of FIG. 9 unless the short length fuel rods are arranged in the outermost tier, and further, the fuel assembly 1D shown in FIG. 11 may be used. The fuel assembly 1D is a fuel assembly that in the fuel assembly 1C, the water rod 3C is replaced with a water rod 3D having a rectangular horizontal cross section.

Embodiment 3

Figure 12:
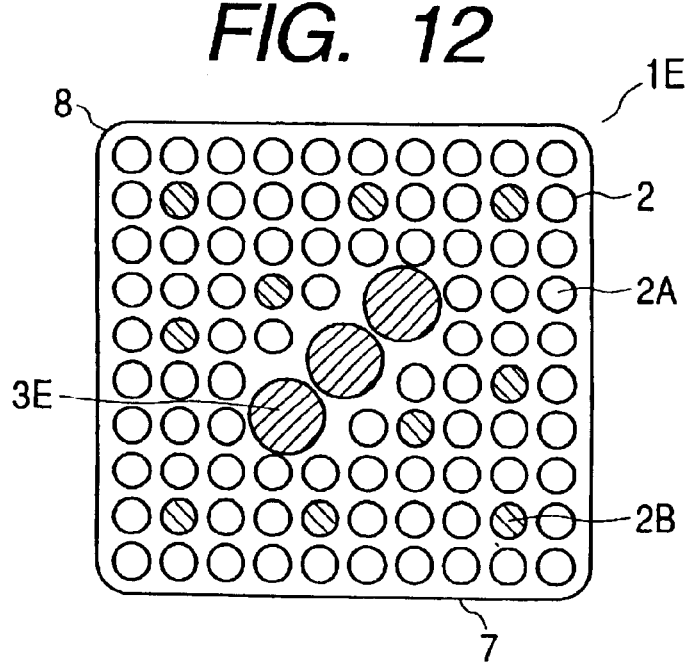

A third embodiment of a fuel assembly in accordance with the present invention will be described below, referring to FIG. 12. The present embodiment of the fuel assembly 1E is loaded in a reactor core of a boiling water reactor. In the fuel assembly 1E, the two water rods 3 of the fuel assembly 1 (FIG. 1) are replaced with three water rods 3E. The three water rods 3E are positioned on one diagonal line intersecting at right angle with the other diagonal line passing through the corner portion 8 of the fuel assembly 1E facing a control rod, and are adjacent to each other. One middle rod among the water rods 3E is also placed on the diagonal line passing through the corner position 8. That is, this one middle rod among the water rods 3E is placed at the axis of the fuel assembly 1E. The three water rods 3E occupy a region capable of arranging 10 rods of the fuel rods 2. The outer diameter of the water rods 3E is smaller than the outer diameter of the water rod 3 (FIG. 1). 10 rods of the short length fuel rods 2B are arranged. 8 rods among the 10 short length fuel rods 2B are arranged in the second tier in the fuel rod array. Each of the remaining 2 short length fuel rods 2B is placed at the corner in the fourth tier of the fuel rod array. In the second tier of the fuel rod array, the short length fuel rod 2B is placed at each of the corners. The dimensions of the inner width Dcb of the channel box 7, the outer diameter Df of the fuel rod 2, the fuel rod pitch Pf and the effective fuel length Lf of the fuel rod 2A in the present embodiment are the same as those of the fuel assembly 1. In the present embodiment, the short length fuel rods 2B are not arranged in the outermost tier of the fuel rod array either.

The fuel assembly 1E is constructed so that the effective fuel length Lp of the short length fuel rod 2B and the total horizontal sectional area Awr of the water rod 3E satisfy the conditions of Equation 1, Equation 4, and Equation 11 to Equation 14. The conditions of Equation 11 to Equation 14 are found from a study performed by the inventors of the present invention.

Figure 13:
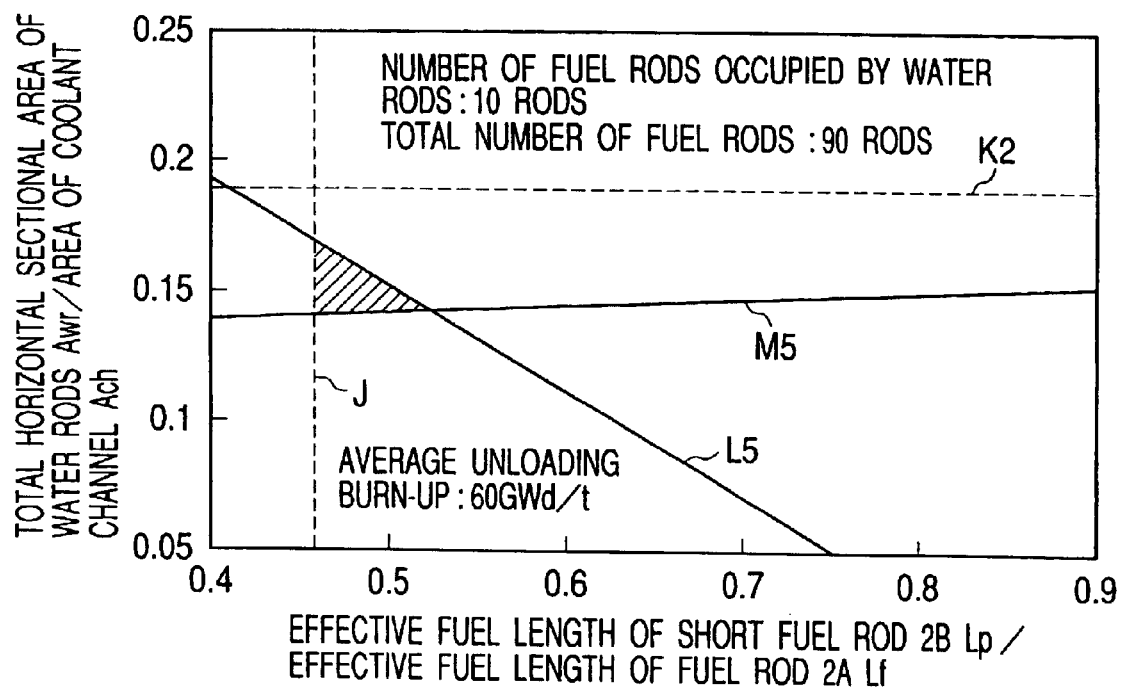
FIG. 13 is a characteristic diagram showing the relationship between effective fuel length Lp of short length fuel rod 2B/effective fuel length Lf of fuel rod 2A and total horizontal sectional area Awr of water rods/coolant channel area Ach in fuel assembly determined from pressure loss and core stability in the fuel assembly of FIG. 12.

An example of a boundary line derived from individual analyses of the pressure loss and the core stability in the present embodiment of the fuel assembly 1E similarly to Embodiment 1 is shown in FIG. 13. The boundary line L5 shown in FIG. 13 is a boundary line for the pressure loss when 10 rods of the short length fuel rods 2B are arranged in the fuel rod array of the fuel assembly 1E except the outermost tier. Similarly, the boundary line M5 is a boundary line for the core stability when 10 rods of the short length fuel rods 2B are arranged.

Therein, the coolant channel area Ach in the fuel assembly 1E can be roughly expressed by the following equation.

$$Ach = Dcb^2 - \pi/4 \times Df^2 \times (100-10) - Awr \qquad \text{(Equation 28)}$$

By substituting the numerical values corresponding to the present embodiment described above into Equation 27, the following equation can be obtained.

$$Ach = 10515 - Awr(mm^2) \qquad \text{(Equation 29)}$$

In addition, the dotted line K2 in FIG. 13 indicates the maximum value of the total horizontal sectional area of all the water rods occupying a region for 10 rods of the fuel rods, and can be expressed by the following equation.

$$Awr = Pf^2 \times 10 \qquad \text{(Equation 30)}$$

Therefore, the value Awr/Ach to the upper limit value of the total horizontal sectional area of all the water rods becomes as follows.

$$Awr/Ach = 1677/(10515-1677) = 0.190 \qquad \text{(Equation 31)}$$

Therefore, the value Awr/Ach must be smaller than 0.190, that is, Equation 12.

Further, in this embodiment, the required number of the short length fuel rods 2B is within a range of 9 to 20 which is obtained from a study similar to that of Embodiment 1.

In FIG. 13, Equation 12 corresponds to the zone lower than the dotted line K2 including the dotted line K1, and Equation 4 corresponds to the zone in right hand side from the dotted line J including the dotted line J. In FIG. 13, the hatched zone is a zone where Equation 1, Equation 4, and Equation 12 to Equation 14 are satisfied to the fuel assembly having 10 rods of the short length fuel rods 2B arranged as shown in FIG. 12. The ratio Lp/Lf and the horizontal sectional area of the water rods 3 are set so as to fall into this zone. However, even in a case of satisfying Equation 11, that is, $10 \leq n \leq 20$, there is a zone where Equation 1, Equation 4, and Equation 12 to Equation 14 are satisfied.

Figure 14:
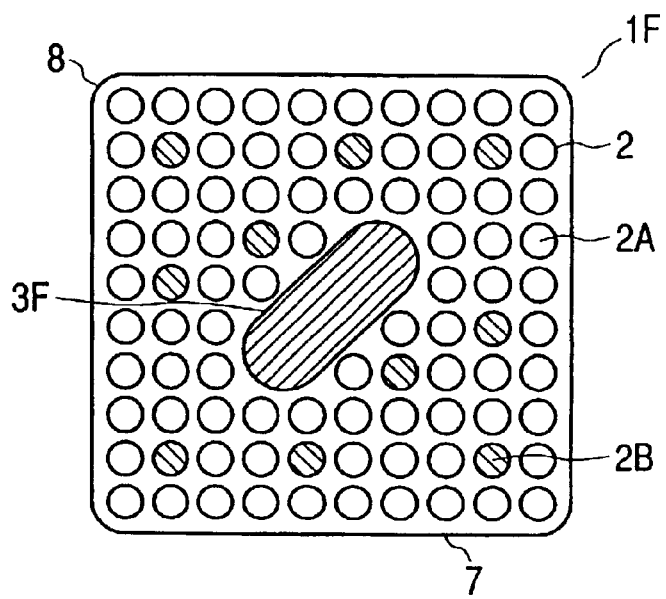
FIG. 14 and FIG. 15 are horizontal cross-sectional views showing other embodiments of fuel assemblies in accordance with the present invention.

According to the present embodiment, the same effects similar to those of Embodiment 1 can be obtained. The short length fuel rods may be arranged in different positions from those of FIG. 12 unless the short length fuel rods are arranged in the outermost tier, and further, the fuel assembly 1F shown in FIG. 14 may be used. The fuel assembly 1F is a fuel assembly that in the fuel assembly 1E, the water rods 3E are integrated into a single rod of water rod 3F. The water rod 3F is placed at the same position of the three water rods 3C.

Embodiment 4

A fourth embodiment of a fuel assembly 1G in accordance with the present invention will be described below, referring to FIG. 15. The present embodiment of the fuel assembly 1G is loaded in a reactor core of a boiling water reactor. The fuel assembly 1G has a construction that in the fuel assembly 1 shown in FIG. 1, the arrangement of the short length fuel rods 2B is changed. That is, the short length fuel rods 2B are not arranged in the second tier of the fuel rod array from the outer side, but arranged in the outermost tier of the fuel rod array. In the outermost tier, two rods of the short length fuel rods 2B are arranged in the middle portion of each side adjacent to each other. The other structure of the fuel assembly 1G is the same as that of Embodiment 1. The dimensions of the inner width Dcb of the channel box 7, the outer diameter Df of the fuel rod 2, the fuel rod pitch Pf and the effective fuel length Lf of the fuel rod 2A are the same as those of the fuel assembly 1.

The fuel assembly 1G is constructed so that the effective fuel length Lp of the short length fuel rod 2B and the total horizontal sectional area Awr of the water rod 3E satisfy the conditions of Equation 1, Equation 3, Equation 4, Equation 6, Equation 11 and Equation 15. The conditions expressed by these equations are found from a study performed by the inventors of the present invention.

Figure 16:
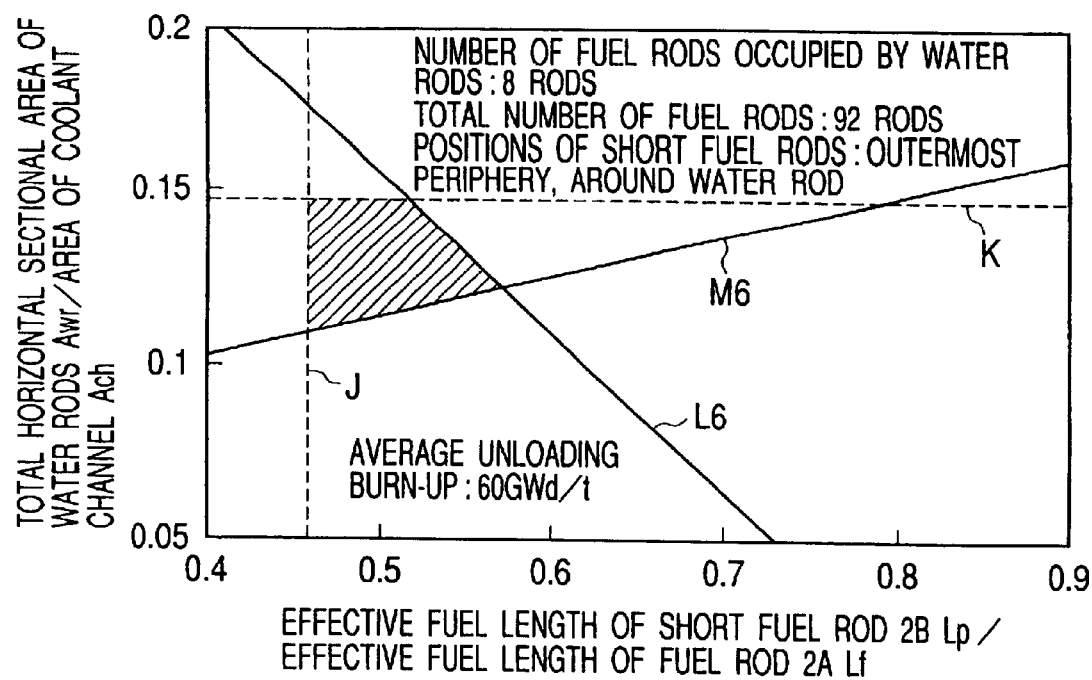
FIG. 16 is a characteristic diagram showing the relationship between effective fuel length Lp of short length fuel rod 2B/effective fuel length Lf of fuel rod 2A and total horizontal sectional area Awr of water rods/coolant channel area Ach in fuel assembly determined from pressure loss and core stability in the fuel assembly of FIG. 15.

An example of a boundary line derived from individual analyses of the pressure loss and the core stability in the present embodiment of the fuel assembly 1G similarly to Embodiment 1 is shown in FIG. 16. The boundary line L6 shown in FIG. 16 is a boundary line for the pressure loss when 12 rods of the short length fuel rods 2B are arranged in the fuel rod array of the fuel assembly 1G including the outermost tier. Similarly, the boundary line M6 is a boundary line for the core stability when 12 rods of the short length fuel rods 2B are arranged. In the present embodiment, because all the short length fuel rods 2B are arranged at the positions where the effect of improving the void coefficient is large, that is, at the positions in the outermost tier of the fuel rod array and adjacent to the water rods, the condition for the core stability, that is, Equation 15 is different from the condition for the core stability in Embodiment 1, that is, Equation 5. The total horizontal sectional area of the water rods in the present embodiment is smaller than that of Embodiment 1 when the core stability is the same. On the other hand, the condition determined from the pressure loss in the present embodiment, that is, Equation 6 is not influenced by the arrangement of the short length fuel rods, and is the same as that of Embodiment 1. Further, the upper limit value for Awr/Ach is a value shown by Equation 23 similarly to Embodiment 1. In the present embodiment, the required number of the short length fuel rods 2B is within a range of 9 to 20 which is obtained from a study similar to that of Embodiment 1.

Figure 15:
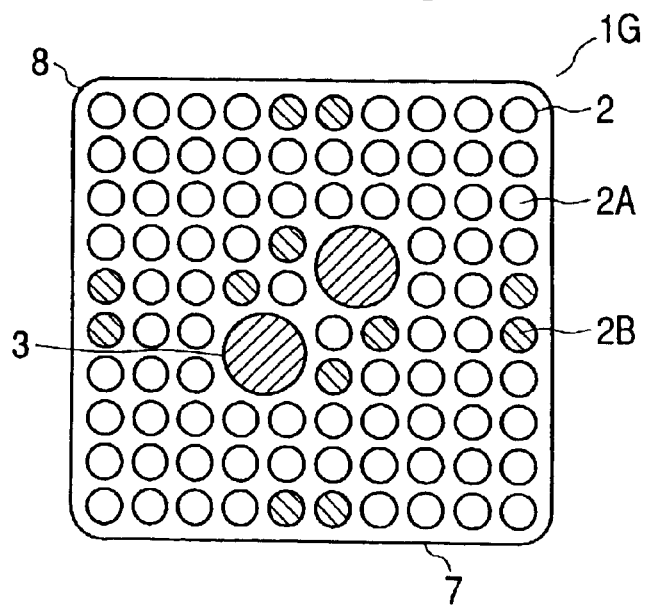

In FIG. 16, the hatched zone is a zone where Equation 1, Equation 3, Equation 4, Equation 6 and Equation 15 are satisfied to the fuel assembly having 12 rods of the short length fuel rods 2B arranged as shown in FIG. 15. The ratio Lp/Lf and the horizontal sectional area of the water rods 3 are set so as to fall into this zone. However, even in a case of satisfying Equation 11, that is, $10 \leq n \leq 20$, there is a zone where Equation 1, Equation 3, Equation 4, Equation 6 and Equation 15 are satisfied.

By arranging the short length fuel rods 2B in the outermost tier, the void coefficient is reduced to more than one half as small as that in the case where the short length fuel rods 2B are arranged in the second tier of the fuel rod array from the outer side. When the short length fuel rods 2B are arranged at the corners of the outermost tier, the reducing rate of the void coefficient becomes maximum. However, in the case where the short length fuel rods 2B are arranged at the corners of the outermost tier, both of the reactivity loss and the local power peaking factor of the short length fuel rods arranged at the corners become large. Therefore, arranging of the short length fuel rods 2B at the corners should be avoided. The reactivity loss can be reduced by arranging the short length fuel rods 2B at positions other than the corner in the outermost tier. Further, by arranging the short length fuel rods at the positions in the outermost tier of the fuel rod array intersecting with a row or a column of the fuel rod array on which each of the water rod 3 is arranged (in concrete, at the four fuel rod positions at middle portions in the individual sides of the outermost tier), the reactivity loss and the local power peaking can be reduced.

According to the present embodiment, the same effects as those of the first embodiment can be obtained, and further the void coefficient can be reduced. In addition, the reactivity loss and the local power peaking can be also reduced.

Figure 17:
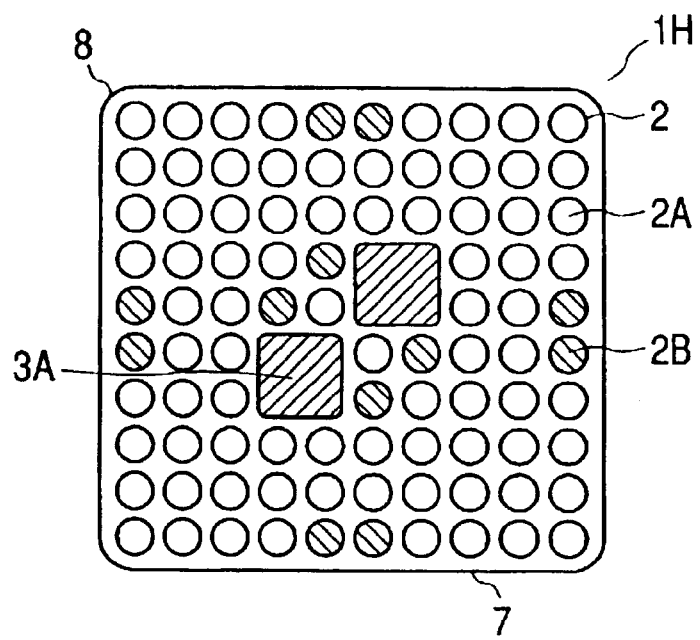
FIG. 17 and FIG. 18 are horizontal cross-sectional views showing other embodiments of fuel assemblies in accordance with the present invention.

The short length fuel rods may be arranged differently from the arrangement of FIG. 15 if the short length fuel rods are arranged both in the positions in the outermost tier and in the positions adjacent to the water rods, or arranged only in the outermost tier, and further the fuel assembly 1H shown in FIG. 17 may be acceptable. The fuel assembly 1H is that in the fuel assembly 1G, the water rods 3 are replaced with the water rods 3A having a rectangular horizontal section. The two water rods 3A are arranged at the same positions as those of the two water rods 3.

Embodiment 5

A fifth embodiment of a fuel assembly 1I in accordance with the present invention will be described below, referring to FIG. 18. The present embodiment of the fuel assembly 1I is loaded in a reactor core of a boiling water reactor. The fuel assembly 1I has a construction that in the fuel assembly 1C shown in FIG. 9, the arrangement of the short length fuel rods 2B is changed. The other construction of the fuel assembly 1I is the same as that of the fuel assembly 1C. The arrangement of the water rod 3C of the fuel assembly 1I is also the same as that of the fuel assembly 1C. The present embodiment has 12 rods of the short length fuel rods 2B. These short length fuel rods 2B are not arranged in the second tier from the outer side of the fuel rod array. Eight rods of the short length fuel rods 2B are arranged in the outermost tier of the fuel rod array, and two rods are arranged in the middle portion on each side of the fuel rod array adjacent to each other. The remainder of four rods of the short length fuel rods 2B are arranged in the fourth tier from the outer side of the fuel rod array in the side of the corner portion 8 side facing a control rod under the state when the fuel assembly 1I is loaded in the reactor core of the boiling water reactor and in the third tier from the outer side of the fuel rod array in the opposite side of the corner portion 8 side. Each of these four short length fuel rods 2B is adjacent to the water rod 3C. The dimensions of the inner width Dcb of the channel box 7, the outer diameter Df of the fuel rod 2, the fuel rod pitch Pf and the effective fuel length Lf of the fuel rod 2A are the same as those of the fuel assembly 1.

The fuel assembly 1I is constructed so that the effective fuel length Lp of the short length fuel rod 2B and the total horizontal sectional area Awr of the water rod 3 satisfy the conditions of Equation 1, Equation 4, Equation 8, Equation 10, Equation 16 and Equation 17. The conditions expressed by these equations are found from a study performed by the inventors of the present invention.

Figure 19:
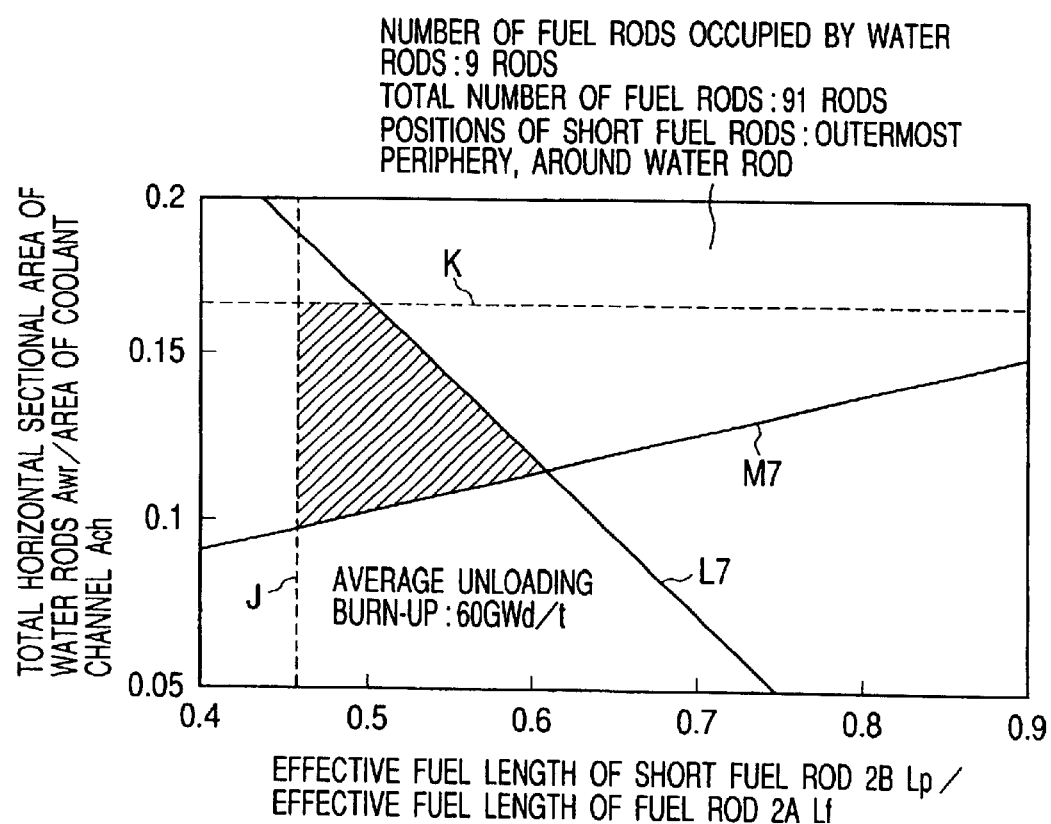
FIG. 19 is a characteristic diagram showing the relationship between effective fuel length Lp of short length fuel rod 2B/effective fuel length Lf of fuel rod 2A and total horizontal sectional area Awr of water rods/coolant channel area Ach in fuel assembly determined from pressure loss and core stability in the fuel assembly of FIG. 18.

An example of a boundary line derived from individual analyses of the pressure loss and the core stability in the present embodiment of the fuel assembly 1I similarly to Embodiment 1 is shown in FIG. 19. The boundary line L7 shown in FIG. 19 is a boundary line for the pressure loss when 12 rods of the short length fuel rods 2B are arranged in the fuel rod array of the fuel assembly 1I including the outermost tier. Similarly, the boundary line M7 is a boundary line for the core stability when 12 rods of the short length fuel rods 2B are arranged. In the present embodiment, because all the short length fuel rods 2B are arranged at the positions where the effect of improving the void coefficient is large, that is, at the positions in the outermost tier of the fuel rod array and adjacent to the water rods, the condition for the core stability, that is, Equation 17 is different from the condition for the core stability in Embodiment 2, that is, Equation 9. The total horizontal sectional area of the water rods in the present embodiment is smaller than that of Embodiment 2 when the core stability is the same. On the other hand, the condition determined from the pressure loss in the present embodiment, that is, Equation 10 is not influenced by the arrangement of the short length fuel rods, and is the same as that of Embodiment 2. Further, the upper limit value for Awr/Ach is a value shown by Equation 27 similarly to Embodiment 2. In the present embodiment, the required number of the short length fuel rods 2B is within a range of 8 to 20 which is obtained from a study similar to that of Embodiment 1.

Figure 18:
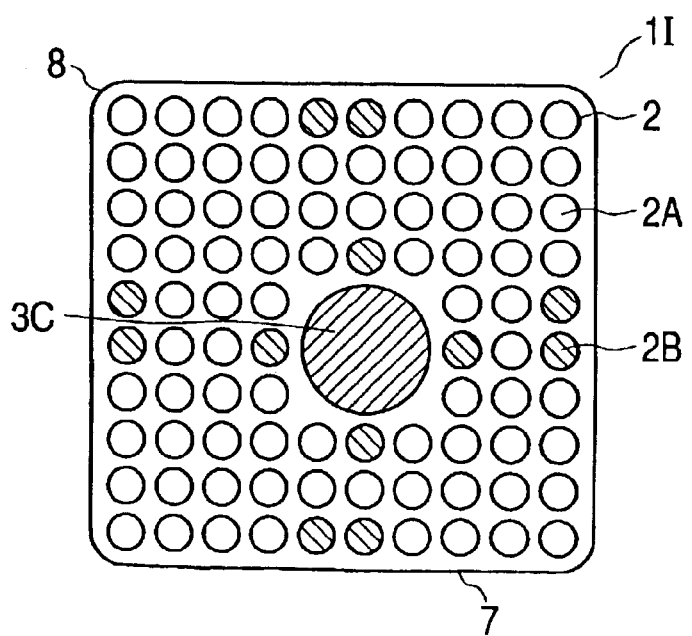

In FIG. 19, the hatched zone is a zone where Equation 1, Equation 4, Equation 8, Equation 10 and Equation 17 are satisfied to the fuel assembly having 12 rods of the short length fuel rods 2B arranged as shown in FIG. 18. The ratio Lp/Lf and the horizontal sectional area of the water rods 3 are set so as to fall into this zone. However, even in a case of satisfying Equation 16, that is, $8 \leq n \leq 20$, there is a zone where Equation 1, Equation 4, Equation 8, Equation 10 and Equation 17 are satisfied.

Figure 20:
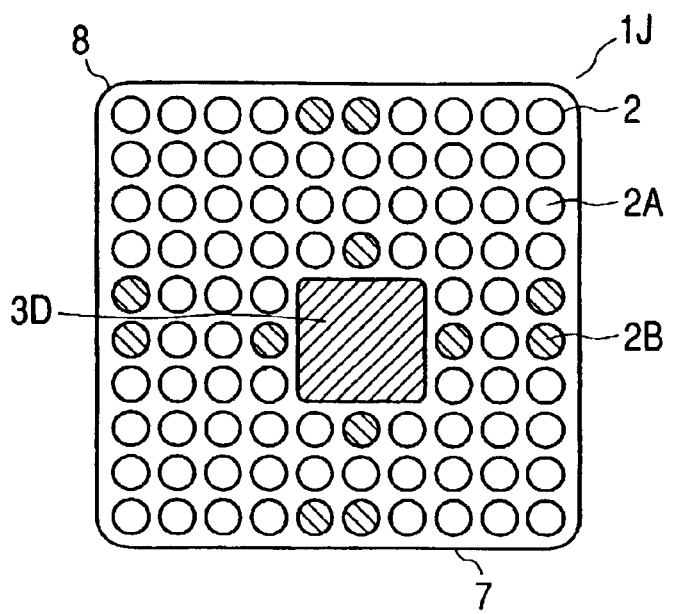
FIG. 20 and FIG. 21 are horizontal cross-sectional views showing other embodiments of fuel assemblies in accordance with the present invention.

According to the present embodiment, the effects similar to those of Embodiment 4 can be obtained. Further, the short length fuel rods may be arranged differently from the arrangement of FIG. 18 if the short length fuel rods are arranged both in the positions in the outermost tier and in the positions adjacent to the water rods, or arranged only in the outermost tier, and further the fuel assembly 1J shown in FIG. 20 may be acceptable. The fuel assembly 1J is that in the fuel assembly 1I, the water rod 3C is replaced with the water rod 3D having a rectangular horizontal section. The water rod 3D is arranged at the same positions as those of the two water rod 3C.

Embodiment 6

A sixth embodiment of a fuel assembly 1K in accordance with the present invention will be described below, referring to FIG. 21. The present embodiment of the fuel assembly 1K is loaded in a reactor core of a boiling water reactor. The fuel assembly 1K has a construction that in the fuel assembly 1E shown in FIG. 12, the arrangement of the short length fuel rods 2B is changed. The other construction of the fuel assembly 1K is the same as that of the fuel assembly 1E. The arrangement of the water rod 3E of the fuel assembly 1K is also the same as that of the fuel assembly 1E. The present embodiment has 10 rods of the short length fuel rods 2B. These short length fuel rods 2B are not arranged in the second tier from the outer side of the fuel rod array. Eight rods of the short length fuel rods 2B are arranged in the outermost tier of the fuel rod array similarly to the fourth embodiment, and two rods are arranged in the middle portion on each side of the fuel rod array adjacent to each other. The remainder of 2 rods of the short length fuel rods 2B are arranged in the fourth tier from the outer side of the fuel rod array, and each of these 2 short length fuel rods 2B is adjacent to the water rods 3E. The dimensions of the inner width Dcb of the channel box 7, the outer diameter Df of the fuel rod 2, the fuel rod pitch Pf and the effective fuel length Lf of the fuel rod 2A are the same as those of the fuel assembly 1.

Figure 22:
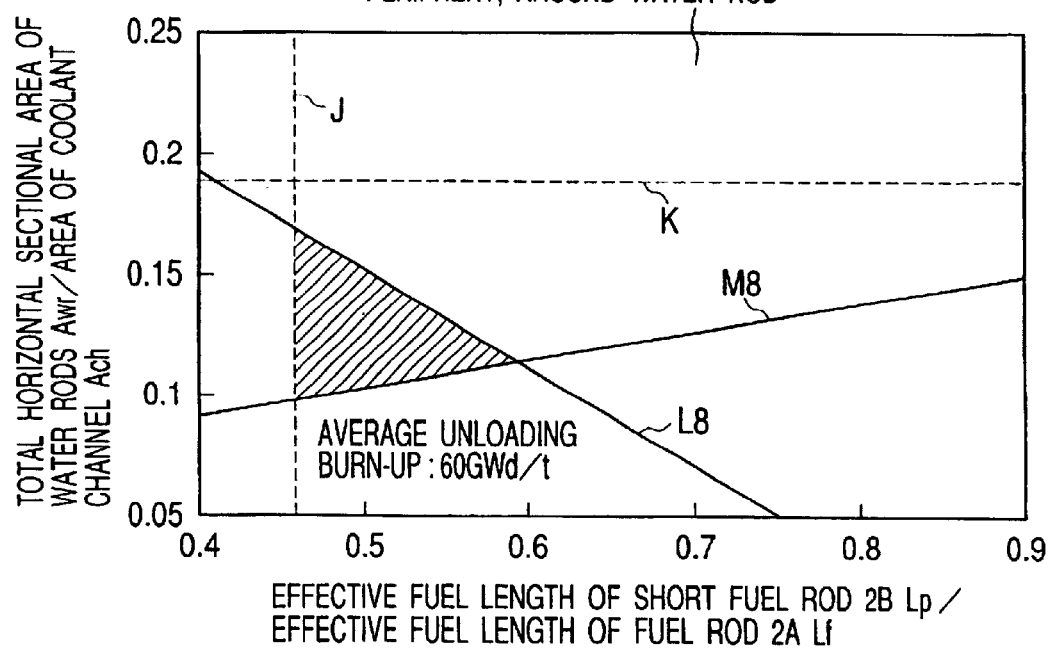
FIG. 22 is a characteristic diagram showing the relationship between effective fuel length Lp of short length fuel rod 2B/effective fuel length Lf of fuel rod 2A and total horizontal sectional area Awr of water rods/coolant channel area Ach in fuel assembly determined from pressure loss and core stability in the fuel assembly of FIG. 21.
Figure 23:
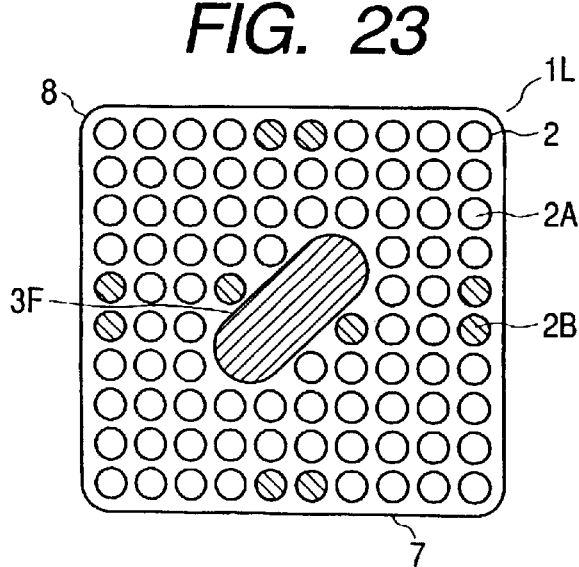
FIG. 23 is another embodiment of a fuel assembly in accordance with the present invention.

The fuel assembly 1K is constructed so that the effective fuel length Lp of the short length fuel rod 2B and the total horizontal sectional area Awr of the water rods 3 satisfy the conditions of Equation 1, Equation 4, Equation 12, Equation 14, Equation 18 and Equation 19. The conditions expressed by these equations are found from a study performed by the inventors of the present invention. An example of a boundary line derived from individual analyses of the pressure loss and the core stability in the present embodiment of the fuel assembly 1K similarly to Embodiment 1 is shown in FIG. 22. The boundary line L8 shown in FIG. 22 is a boundary line for the pressure loss when 10 rods of the short length fuel rods 2B are arranged in the fuel rod array of the fuel assembly 1K including the outermost tier. Similarly, the boundary line M8 is a boundary line for the core stability when 12 rods of the short length fuel rods 2B are arranged. In the present embodiment, because all the short length fuel rods 2B are arranged at the positions where the effect of improving the void coefficient is large, that is, at the positions in the outermost tier of the fuel rod array and adjacent to the water rods, the condition for the core stability, that is, Equation 19 is different from the condition for the core stability in Embodiment 3, that is, Equation 13. The total horizontal sectional area of the water rods 3C in the present embodiment is smaller than that of Embodiment 2 when the core stability is the same. On the other hand, the condition determined from the pressure loss in the present embodiment, that is, Equation 14 is not influenced by the arrangement of the short length fuel rods, and is the same as that of Embodiment 3. Further, the upper limit value for Awr/Ach is a value shown by Equation 31 similarly to Embodiment 3. In the present embodiment, the required number of the short length fuel rods 2B is within a range of 7 to 20 which is obtained from a study similar to that of Embodiment 1.

Figure 21:
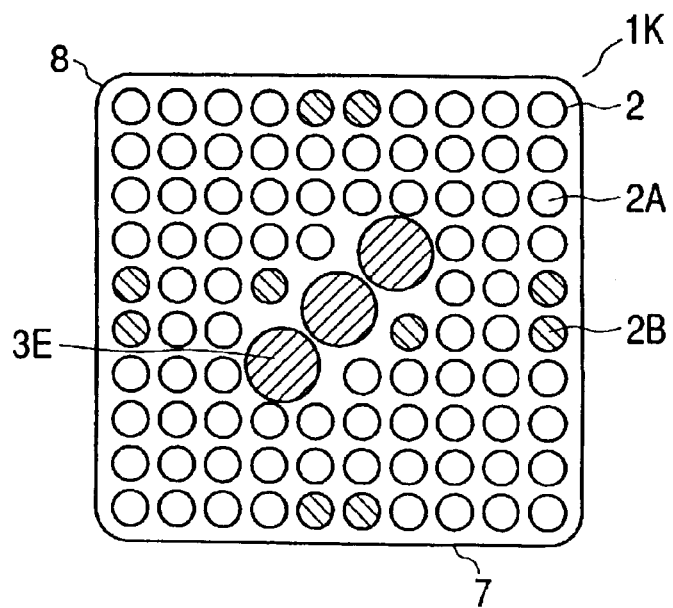

In FIG. 22, the hatched zone is a zone where Equation 1, Equation 4, Equation 12, Equation 14 and Equation 19 are satisfied to the fuel assembly having 10 rods of the short length fuel rods 2B arranged as shown in FIG. 21. The ratio Lp/Lf and the horizontal sectional area of the water rods 3E are set so as to fall into this zone. However, even in a case of satisfying Equation 18, that is, $7 \leq n \leq 20$, there is a zone where Equation 1, Equation 4, Equation 12, Equation 14 and Equation 19 are satisfied.

According to the present embodiment, the effects similar to those of Embodiment 4 can be obtained. Further, the short length fuel rods may be arranged differently from the arrangement of FIG. 21 if the short length fuel rods are arranged both in the positions in the outermost tier and in the positions adjacent to the water rods, or arranged only in the outermost tier, and further the fuel assembly 1L shown in FIG. 22 may be acceptable. The fuel assembly 1L is that in the fuel assembly 1K, the water rods 3E are replaced with a water rod 3F having a rectangular horizontal section. The water rod 3F is arranged at the same positions as those of the water rods 3E.

INDUSTRIAL USABILITY OF THE INVENTION

The fuel assembly in accordance with the present invention is suitable for loading into a core of a boiling water reactor.

What is claimed is:

1. A fuel assembly comprising a plurality of first fuel rods and a plurality of second fuel rods having a length shorter than a length of the plurality of first fuel rods, said first and said second fuel rods being arranged in a fuel rod array of 10 rows by 10 columns; and a plurality of water rods occupying regions allowing arrangement of 8 fuel rods, said second fuel rods being not arranged in an outermost tier of the fuel rod array, which satisfies the following conditions:

$B \geq 60$, $15 \leq n \leq 20 (n: \text{integer})$, $Awr/Ach \leq 0.149$, $Lp/Lf \geq 11/24$, $Awr/Ach \geq (3.00 \times 10^{-4} \times n^2 + 6.00 \times 10^{-4} \times n - 1.2 \times 10^{-2}) \times (Lp/Lf - 1) + 1.75 \times 10^{-1}$, and $Awr/Ach \leq (8.63 \times 10^{-4} \times n^2 - 6.09 \times 10^{-2} \times n + 1.33 \times 10^1) \times (Lp/Lf - 8.32 \times 10^{-1})$ where Awr is a total sum of horizontal sectional areas of said water rods, Ach is a horizontal sectional area of a coolant flow passage in a bottom portion of said fuel assembly, Lf is an effective fuel length of said first fuel rods, n is the number of said second fuel rods, Lp is an effective fuel length of said second fuel rods, and B (GWd/t) is an average unloading burn-up.

2. A fuel assembly according to claim 1, wherein some of said second fuel rods are arranged adjacent to said water rods and some of said second fuel rods are arranged in a second tier from the outer side in the fuel rod array.

3. A fuel assembly according to claim 1, wherein each of said water rods has a horizontal sectional area arranged in a region allowing arrangement of four fuel rods, and the number of said water rods is two.

* * * * *